(12) United States Patent
Grandgirard et al.

(10) Patent No.: US 8,904,735 B2
(45) Date of Patent: Dec. 9, 2014

(54) WINDOW HAVING AN ENCAPSULATED PROFILED SEAL AND INSERT FASTENED TO THE SEAL, FASTENER FOR FASTENING THE INSERT FOR THE WINDOW AND METHOD OF MANUFACTURING THE WINDOW

(75) Inventors: Bastien Grandgirard, Marqueglise (FR); Pascal Lefevre, Viry Noureuil (FR); Loic Froissard, Choisy-au-Bac (FR); Romain Gonnet, Lacroix Saint Ouen (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 13/876,758

(22) PCT Filed: Sep. 28, 2011

(86) PCT No.: PCT/FR2011/052263
§ 371 (c)(1),
(2), (4) Date: Mar. 28, 2013

(87) PCT Pub. No.: WO2012/042172
PCT Pub. Date: Apr. 5, 2012

(65) Prior Publication Data
US 2013/0186018 A1 Jul. 25, 2013

(30) Foreign Application Priority Data

Sep. 28, 2010 (FR) ........................................ 10 57801

(51) Int. Cl.
*E04B 1/00* (2006.01)
*B60J 10/00* (2006.01)
*B60J 1/10* (2006.01)
*B60R 13/04* (2006.01)

(52) U.S. Cl.
CPC .......... *B60J 10/0054* (2013.01); *B60J 10/0062* (2013.01); *B60J 1/10* (2013.01); *B60J 10/0051* (2013.01); *B60R 13/04* (2013.01)
USPC .................. 52/745.15; 52/204.72; 52/204.53; 52/211

(58) Field of Classification Search
USPC ................ 52/204.71, 204.72, 204.5, 204.53, 52/287.1, 288.1, 211; 29/451, 521
See application file for complete search history.

(56) References Cited

U.S. PATENT DOCUMENTS 3,338,007 A * 8/1967 Draplin ........................... 52/208
3,744,201 A * 7/1973 Dochnahl ................. 52/204.597
(Continued)

FOREIGN PATENT DOCUMENTS

| DE | 34 32 592 A1 | 3/1986 |
| DE | 20 2010 001 223 U1 | 5/2010 |
| FR | 2 577 483 A1 | 8/1986 |

OTHER PUBLICATIONS

International Search Report issued Mar. 2, 2012 in PCT/FR2011/052263.

*Primary Examiner* — William Gilbert
*Assistant Examiner* — Gisele Ford
(74) *Attorney, Agent, or Firm* — Oblon, Spivak, McClelland, Maier & Neustadt, L.L.P.

(57) ABSTRACT

A window including a glazed element, at least one portion of a profiled seal, at least one insert or a trim, and at least one fastener for fastening the insert to the portion of the profiled seal. The fastener includes a plate having a longitudinal axis, the plate being at least partially overmolded in the portion of the profiled seal and supporting at least two flanges located outside the portion of the profiled seal, for fastening the insert to the fastener, the flanges being longitudinally offset.

13 Claims, 5 Drawing Sheets

(56) References Cited

U.S. PATENT DOCUMENTS

| | | |
|---|---|---|
| 4,904,014 A | 2/1990 | Azarovitz et al. |
| 5,353,571 A * | 10/1994 | Berdan et al. ................. 52/716.5 |
| 5,624,148 A * | 4/1997 | Young et al. ..................... 296/93 |
| 6,546,683 B1 | 4/2003 | Senge |
| 6,715,821 B2 * | 4/2004 | Kanie et al. ............... 296/146.15 |
| 6,908,557 B2 * | 6/2005 | Chordia et al. ............... 210/659 |
| 7,641,250 B2 * | 1/2010 | Gambatese .................. 296/1.08 |
| 7,918,058 B2 | 4/2011 | Debailleul et al. |
| 8,495,841 B2 * | 7/2013 | DeGroff .......................... 52/207 |
| 8,505,262 B2 * | 8/2013 | Senge .......................... 52/716.5 |
| 2003/0075949 A1 | 4/2003 | Kanie et al. |
| 2011/0138716 A1* | 6/2011 | Schulte et al. .................. 52/208 |
| 2012/0045608 A1 | 2/2012 | Huchet et al. |
| 2013/0086855 A1 | 4/2013 | Grandgirard et al. |

\* cited by examiner

WINDOW HAVING AN ENCAPSULATED PROFILED SEAL AND INSERT FASTENED TO THE SEAL, FASTENER FOR FASTENING THE INSERT FOR THE WINDOW AND METHOD OF MANUFACTURING THE WINDOW

CROSS-REFERENCE TO RELATED APPLICATIONS

The present application is the U.S. counterpart of WO 2012/042172, and claims priority to French Application No. 1057801 filed on Sep. 28, 2010, the entire contents of each of which are incorporated by reference in their entirety.

TECHNICAL FIELD

The present invention relates to a fastener for fastening an insert, such as a trim, onto a window, especially a window used on a vehicle. The present invention also relates to windows employing such a fastener.

BACKGROUND

Throughout the present document, the term "insert" denotes an accessory of the window, in particular an accessory of elongate shape, but does not designate a vehicle body element.

To improve the esthetics of certain windows, especially windows used in the automotive field, it is known to employ trims that usually consist of profiled elements clip-fastened onto clips that are attached to a profiled sealing bead, these being made for example of a flexible polymer, which bead is overmolded onto each window, especially on the periphery thereof.

Thus, international application WO 2005/033526 teaches a system for clip-fastening a profiled trim for a profiled sealing bead using a flexible clip having a simple first boss, intended to be inserted into a simple first groove of the profiled sealing bead, and a more complex, hook-shaped second boss intended to be inserted into a likewise more complex groove of the profiled sealing bead by deforming the flexible clip. The clip is thus hooked onto the profiled sealing bead. However, a pinching effect of the profiled sealing bead is obtained by making the distance between the two bosses of the clip slightly shorter than that between the two grooves of the profiled sealing bead.

To fasten the profiled trim, this is firstly inserted into a boss of the clip, and then the clip is again deformed so as to enable the profiled trim to pass above a projection of the profiled sealing bead.

However, it turns out that this deformation is exactly contrary to the deformation that allows the clip to be attached to the profiled sealing bead.

Once the flexible clip has been fitted, it is thus permanently subjected to opposing tensile forces that attempt both to keep it hooked onto the profiled sealing bead and to keep the profiled trim clipped onto the clip.

When used on a vehicle, such a system has the drawback that the vibrations to which the profiled sealing bead is subjected during operation of the vehicle, particularly on a bumpy road, cause the sealing bead to be deformed, running the risk eventually of the clip becoming detached, resulting in the loss of the profiled trim.

Also known, from international application WO 2007/003823, is an intermediate fastening device of the type described above.

According to that document, the cooperating upstream part comprises at least one protruding male element or at least one hollow female element, which element cooperates with a corresponding hollow female element or with a corresponding protruding male element respectively, provided in the profiled sealing bead, said hollow female element having the internal dimensions at least in part smaller than the external dimensions of said protruding male element.

This cooperation is thus of the "mortice and tenon" type with a rubbing effect between at least part of the surfaces of the elements.

One important advantage of this device with respect to the previous one lies in the reliability of the fastening system: it enables the profiled trim to be reliably held in place, including under extreme, especially vibrational, conditions.

However, this system complicates the design of the profiled sealing bead and necessitates designing a particular profiled sealing bead having particular male or female regions.

In particular, this system requires the clip to be positioned very precisely in order for the upstream cooperating part to cooperate correctly with the corresponding part provided in the profiled sealing bead.

Moreover, U.S. Pat. No. 3,869,760, teaches a clip having resilient legs, these legs being splayed apart in order to pass a boss into which the end of the legs penetrates when an extraction force is applied on the clip.

Furthermore, International Patent Application WO 2008/084076 teaches a profiled trim clip-fastening system for a profiled sealing bead, this profiled sealing bead having regions provided for receiving elements for retaining the clip, these regions being in the form of holes for retaining the arrowhead-shaped retention elements of the clip.

In order to provide the cooperation between the clip and the profiled sealing bead, it is then necessary for the clip to be positioned precisely with respect to the profiled sealing bead in order for the retention elements of the clip to correctly penetrate into the means for receiving the profiled sealing bead.

All these devices for fastening a trim onto a window have the drawback of employing at least one intermediate element which is physically separate from the profiled seal: it is therefore necessary to provide a certain mounting time for mounting the intermediate element on the profiled sealing bead. Furthermore, this mounted assembly is removable so that it is difficult to guarantee that the intermediate element remains fastened to the profiled sealing bead for several tens of years.

Moreover, the prior art teaches, especially French patent application FR 2 577 483 and German patent application DE 34 32 592, a fastening element having teeth located opposite one another, as may be seen in particular in the cross-sectional figures, for fastening an insert. These systems do actually prevent the insert from being pulled off, but they are not entirely satisfactory as they do not lock the insert sufficiently securely in the three dimensions in space.

In particular, on studying document FR 2 577 483, it is obvious that the rotation along the curvature of the insert is not sufficiently prevented: in document DE 34 32 592, this rotation is prevented only by a very complicated profile of the sealing bead.

SUMMARY

The object of the present invention is to remedy the drawbacks of the prior art by providing a fastener which makes it possible to fasten at least one insert, especially a trim, precisely, effectively and removably onto a profiled sealing bead of a window, using at least one intermediate element irremovably (i.e. definitively) fixed to the profiled sealing bead without it being necessary to design a complicated part of the profiled sealing bead.

The present invention thus is based on a solution in which, in respect of an insert, the intermediate element (and preferably the intermediate elements) is (or are) partially incorporated into the profiled sealing bead during formation of the latter by molding onto a glazed element (i.e. "encapsulation" technology) and in which the insert is then effectively clipped onto the intermediate element(s).

Thus, for one window, and from one window to another of the same series, not only is the fastening of each intermediate element by the encapsulant (the material applied by the encapsulation technique) sure and certain, but also the positioning of the intermediate element is precise, easy and rapid since it is positioned inside the encapsulation mold before the formation of the profiled sealing bead.

Thus, one subject of the present invention is a window having alternative embodiments.

The window according to the invention comprises a glazed element, at least one portion of a profiled seal, at least one insert such as a trim, and at least one fastener for fastening said insert to said portion of the profiled seal. According to the invention, said fastener includes a plate having a longitudinal axis, said plate being at least partially overmolded in said portion of the profiled seal and supports at least two flanges that are located outside said portion of the profiled seal, for fastening said insert to said fastener. These at least two flanges, which are thus attached to said plate, extend longitudinally and thus exceed the insert in place by pinching or clip-fastening.

Thus, according to the invention, the intermediate element is integrated into the encapsulant and therefore precisely, surely and certainly fastened to the profiled seal portion.

Furthermore, the removable fastening of the insert is precise and reliable.

Moreover, by not using an intermediate insert after the encapsulation it is possible to optimize the premounting time in so far as only the trim has to be attached to the encapsulated window, whereas, according to certain documents of the prior art, it was necessary also to fit at least one intermediate element (and in general several intermediate elements) with respect to the profiled sealing bead before the trim is clipped onto this (or these) intermediate element(s).

To facilitate molding, it is preferable for the plate of the intermediate piece according to the invention to be substantially flat and to present a mean plane.

The plate of the intermediate piece according to the invention is at least partially overmolded, i.e. at least over part of its periphery and against a part, or even all, of its face turned away from the insert, the plate is not overmolded over its entire face turned toward the insert.

The plate of the intermediate piece according to the invention preferably supports directly, without interposition of a base, the at least two flanges.

Moreover, to facilitate the fitting of the trim onto the clip, at least two flanges each terminate in a distal end (located on the opposite side from the end for connection to the plate) which is preferably hook-shaped in cross section, perpendicular to the longitudinal direction of the plate, at least two hooks being oriented in two opposite directions. These hooks have an elongate shape along the longitudinal direction.

The present invention excludes the possibility of the two flanges being located symmetrically with respect to a plane of symmetry perpendicular to said plate (i.e. perpendicular to the mean plane of said plate), that is to say two flanges are excluded from facing each other along the length of the fastener. The fact that the flanges are longitudinally offset according to the invention means that two flanges cannot face each other along the length of the fastener.

In one embodiment of the invention, two flanges are located symmetrically with respect to an axis of symmetry perpendicular to said plate (perpendicular to the mean plane of said plate). In a preferred variant, this axis of symmetry is perpendicular to the central longitudinal axis of the fastener and also preferably perpendicular to the central transverse axis of the fastener. This consideration and these preferences may apply to any solution for which the fastener comprises an even number of flanges.

In another embodiment, three flanges are located symmetrically with respect to a plane of symmetry perpendicular to said plate (i.e. perpendicular to the mean plane of said plate). In a preferred embodiment, this plane of symmetry passes through a transverse axis of the fastener, being doubly perpendicular to a longitudinal axis and even more preferably passes through the central transverse axis of the fastener, while still being doubly perpendicular to the central longitudinal axis. This consideration and these preferences may apply to any solution of the invention for which the fastener comprises an odd number of flanges.

Whether there is an even number or an odd number of flanges, the symmetry that has just been mentioned makes it possible to distribute the rotational forces experienced by the flanges during the clip-fastening operation, so that these forces compensate for one another: the rotation considered here is a rotation about an axis perpendicular to the mean plane of the plate.

When the plate supports two flanges, said flanges preferably have the same length.

When the plate supports three flanges, the central flange preferably has a length equal to the sum of the length of the other two flanges, these other two flanges having, also preferably, the same length.

For any fastener, it is thus preferable for the total length of the flanges along one direction to be equal to the total length of the flanges in the opposite direction.

In yet another embodiment, the plate is unapertured in its part for joining with at least one flange, or even with all the flanges. Said plate comprises no cut-out crossing the plate in this part for joining with a flange.

In one particular embodiment, at least one flange, and preferably each flange, may be produced from a portion of said plate which is cut out and bent up. Consequently, the plate has at least one opening that corresponds to the respective portion of the plate which was cutout and lifted up to form a flange.

In a very particular embodiment, the plate has a rectangular shape and preferably includes, at each longitudinal end, at least one notch or a hole for positioning and/or fastening said fastener in the encapsulation mold. However, the plate may also be of circular or oval shape.

According to the invention, the plate is preferably overmolded along at least two strips, each having a specific width and each extending along the length of the strip. Thus, in particular the notches or holes at the longitudinal ends are not encapsulated as they are not included in said strips. The advantage of this solution is that the plate is correctly held in place by the material of the seal along its length, in particular during the clip-fastening operation, despite the torsional forces undergone by the flanges during the clip-fastening.

That part of the profiled sealing bead for retaining the intermediate piece, thus preventing it from being pulled off, thus advantageously consists of at least two strips that extend along the length of the plate, i.e. along the length of the insert.

According to one particular feature, at least one flange, and preferably each flange, lies completely within a space bounded by the perpendicular projection of the perimeter of the plate so as to make it easier to demold that portion of the profiled sealing bead which partly integrates the plate.

The insert may be applied at least along one longitudinal edge of the window and may be preferably applied along at least two edges of the window, against said portion of the profiled sealing bead. The insert is therefore held in place by several fasteners according to the invention: preferably at least two fasteners for one edge and therefore at least one fastener for at least the other edge.

According to one particular feature of the invention, the intermediate piece is preferably located outside the space bounded by the projection perpendicular to the perimeter of the glazed element, i.e. the intermediate piece lies completely outside a space bounded by the perpendicular projection of the perimeter of the glazed element: the intermediate piece therefore does not bear on the glazed element.

Another subject of the present invention is a fastener for a window according to the invention, said fastener including a plate having a longitudinal axis, said plate supporting at least two longitudinally offset flanges for fastening said insert to said fastener.

Another subject of the present invention is a method of manufacturing a window, and especially a window according to the invention, said window comprising a glazed element, at least one portion of a profiled seal, at least one insert such as a trim, and at least one fastener for fastening said insert to said portion of the profiled seal. Said fastener includes a plate having a longitudinal axis, said plate being at least partially overmolded in said portion of a profiled seal and supports at least two flanges that are longitudinally offset and located outside said portion of the profiled seal, for fastening said insert to said fastener.

The subject of the present invention is also the use of a fastener for fastening an insert onto a window according to the invention.

BRIEF DESCRIPTION OF THE DRAWINGS

Several embodiments of the present invention will be described below, as nonlimiting examples, with reference to the appended drawings, in which.

In these figures, the proportions of the various elements have been drawn to scale in each figure, but the background elements have not in general been shown so as to make them easier to understand.

DETAILED DESCRIPTION

Figure 1:
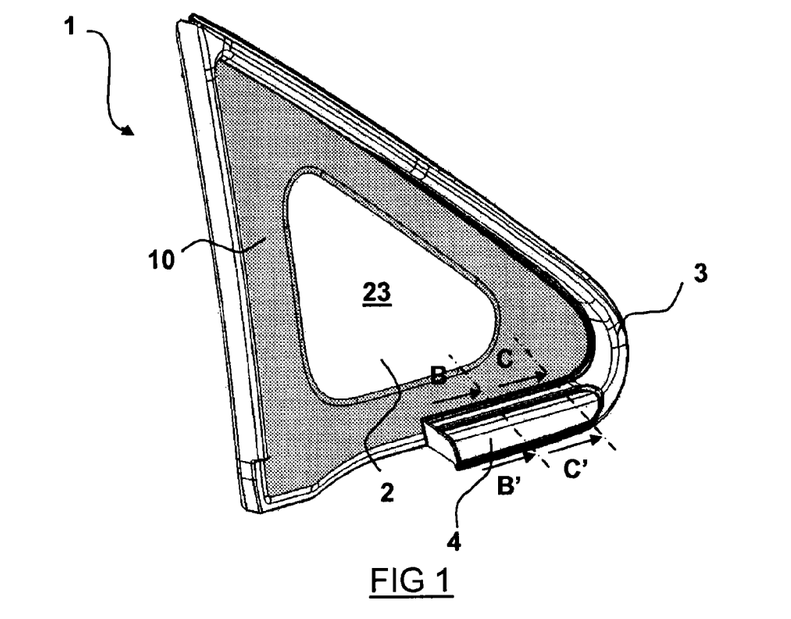
FIG. 1 illustrates a perspective view of a vehicle window having an insert consisting of a profiled trim, said insert being fastened to a profiled sealing bead.

The present invention relates to a window 1, especially a vehicle window as can be seen in FIG. 1, comprising a glazed element 2, at least one portion of a profiled seal 3, at least one insert 4, such as a trim, and at least one fastener 5 for fastening said insert 4 to said portion of the profiled seal 3. The fastener 5 is not visible in FIG. 1 as it is interposed between the portion of the profiled seal 3 and the insert 4.

The window 1 according to the invention, which is illustrated in FIG. 1, is a fixed rear side window of an automobile. It comprises a glazed element 2 which is provided with a portion of a profiled sealing bead 3 made of a flexible polymer material which goes all around the glazed element 2.

The window 1, which optionally includes one (or more) accessories and especially one (or more) accessories for fastening the window, is intended to close off a bay making a separation between an interior space of the vehicle and a space external to the vehicle. The glazed element 2 thus has an inner face 21, intended to be turned toward the interior space, an outer space 23, intended to be turned toward the external space, and a peripheral edge 22.

The glazed element may be a monolithic element, i.e. consisting of a single sheet of material, or may be a composite element, i.e. consisting of several sheets of material between which at least one layer of adherent material is inserted in the case of laminated glazing. The sheet(s) may be made of mineral material, especially glass, or organic material, especially plastic.

In the case of a vehicle window, this generally has at least partly on its periphery an ornamenting strip 10. This ornamental strip results in general from the deposition of enamel, produced on the inner face of the glazed element when it is a monolithic element or on an intermediate face of the glazing in the case of composite glazing, but it may also result from partial and/or peripheral coloration of a sheet of material used, especially a sheet of organic material.

When the glazed element is made of an organic material, it is manufactured prior to the implementation of the invention by molding the constituent material of the glazed element in a molding device that includes a mold having at least a fixed mold part and a moving mold part, which can move relative to the fixed mold part, said mold parts cooperating in the closed state of the mold, during the molding step, in order to form a molding cavity having, in cross section, the cross-sectional shape of the glazed element. Often the glazed element made of organic material is not flat, but curved.

When the glazed element is made of mineral material, it has been manufactured prior to the implementation of the invention by melting the mineral material so as to form a flat sheet, this sheet then being cut and possibly bent and/or tempered.

For information, the mass-manufacture of a glazed element made of organic material is more expensive than the manufacture of a glazed element made of mineral material, the first method of manufacture generally being chosen when the shape of the glazed element is so complex that it cannot be produced by bending a glazed element made of mineral material.

When the glazed element is a composite glazed element, it is manufactured using the well-known technique of manufacturing possibly curved, multiple or laminated, glazing.

In FIG. 1, the glazed element 2 is a monolithic window.

The window illustrated in FIG. 1 is a fixed window, but the present invention may also apply to a movable window.

The portion of the profiled seal 3 thus has an inner part 31, which is intended to be oriented toward the interior of the vehicle, and a lateral part 32, which is located facing the edge 22 of the glazed element and/or an outer part 33 which is intended to be oriented toward the outside of the vehicle.

The constituent polymer material of the profiled sealing bead 3 may be a thermoplastic (PVC, TPE, etc.), a polyurethane, or a synthetic rubber of the EPDM type or any other suitable material.

The profiled sealing bead 3 is manufactured by carrying out what is called an "encapsulation" manufacturing process because it includes a step of molding the profiled sealing bead 3 in a molding device, between two molding elements, a molding element receiving the inner face of the window and one molding element receiving the outer face of the window, these two molding elements being closed up, one onto the other, during the molding step, leaving between them a molding cavity which is filled with the constituent material of the profiled sealing bead during the step of molding this bead.

In FIG. 1, the profiled sealing bead 3 is placed around the entire periphery of the window 1, but this profiled sealing bead could just as well be positioned only over a part of the periphery of the window or over any part of the window. This sealing bead has, in the bottom rear part and in the rear part of the window, a greater thickness than over the rest of the periphery of the window.

In FIG. 1, the insert 4 thus covers a portion of the surface of the outer part 33 of the profiled seal and more precisely a portion of the surface of the rear part of the profiled sealing bead.

Assuming that the fixed rear window is positioned substantially vertically, the fastener is thus elongate along the length of the vehicle and extends both over one face upwardly and over another face on the right or left side of the vehicle. The insert thus has an elongate shape and extends over two mutually perpendicular transverse faces that are joined by a rounded angle.

It is to improve the esthetic appearance of the window that a part of the profiled sealing bead 3 visible from the outside of the vehicle is masked by the insert 4 consisting here of a profiled trim and placed here only over the thick bottom rear part of the profiled sealing bead, although it could also be placed over the entire periphery of the profiled sealing bead and/or over any part of the profiled sealing bead.

The insert is prefabricated: it is manufactured, and possibly shaped, prior to it being fastened to the window. It may be made of aluminum, an aluminum alloy, steel, and especially stainless steel, plastic, and especially a plastic reinforced with fillers, such as for example silica-based mineral fillers or glass fibers. It may also be produced in several parts, possibly with different materials for at least two parts.

According to the invention, the fastener 5 consists of a clip which is intended for allowing the insert 4 to be mounted on the profiled sealing strip 3 by clip-fastening.

Figure 2:
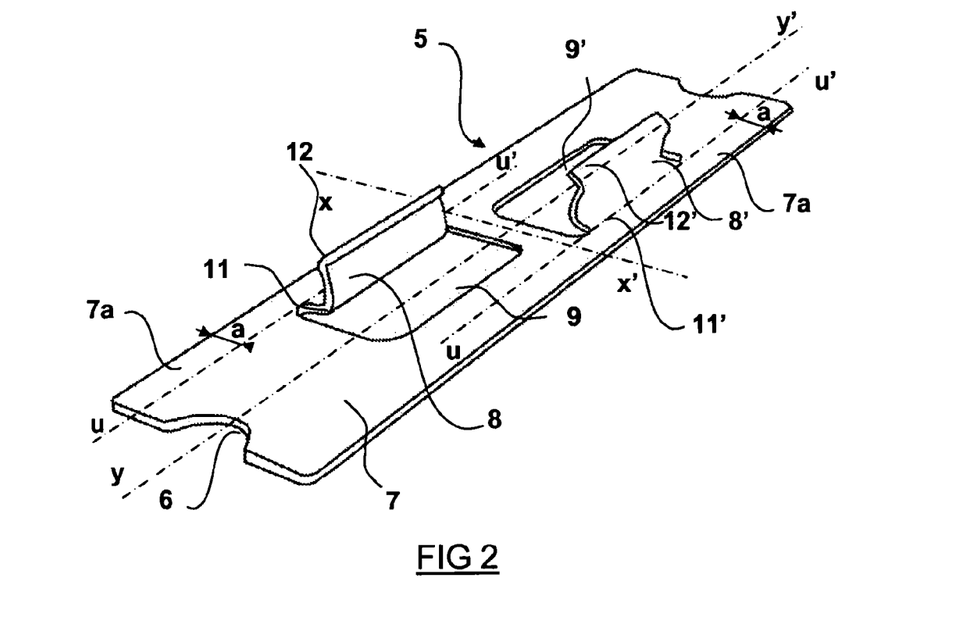
FIG. 2 is a perspective view of a first embodiment of a fastener according to the invention having two longitudinally offset flanges and an apertured plate.
Figure 3:
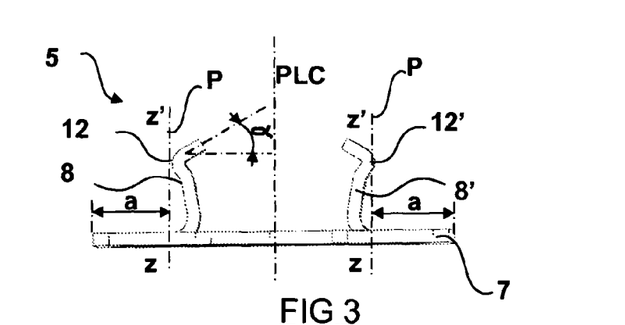
FIG. 3 is a side view of the fastener shown in FIG. 2.

One embodiment of a fastener 5 according to the invention, for mounting the insert 4 on a portion of the profiled sealing bead 3, is illustrated in FIGS. 2 and 3.

In this first embodiment of the invention shown in these figures, the fastener consists of a clip produced from a metal sheet forming a rectangular flat plate 7. The fastener 5 has a central longitudinal axis yy' and a central transverse axis xx', perpendicular to the central longitudinal axis yy', and also a central longitudinal plane PLC which is the plane passing through the central longitudinal axis yy' and perpendicular to the plane of the plate 7.

In FIG. 2, the axis of symmetry, showing the axial symmetry of the configuration of the flanges, is the axis which is perpendicular both to the central longitudinal axis yy' and to the central transverse axis xx'.

Two partial cut-outs 9, 9' are produced in the plate 7 so as to form, by bending of these two cut-outs, two flanges 8, 8' extending substantially perpendicular to the plate 7.

To form each of the flanges 8, 8' a cut is made in the internal area of the plate 7 (i.e. a cut that does not reach the periphery of the plate) along three pairwise perpendicular sides and the side complementary to the three sides of the cut-out is preserved, so as to form a proximal end 11, 11' of each flange 8, 8' that extends along an axis uu' parallel to the central longitudinal axis yy' and forms a "hinge" about which the cut-out flange is bent to a rounded shape so as to make it occupy a position approximately perpendicular to the plate 7. Next, the distal end 12, 12' of the flange 8, 8', (that is to say the end opposite the join between the flange and the plate) is subjected to a second bending operation so that said end forms a rounded shape, in such a way that said end is inclined toward the central longitudinal plane PLC by an angle α of about 30° to the plane of the plate and so as to form a longitudinal boss on the flange, as may be seen in FIG. 3.

Thus, by virtue of this second bending operation, the two flanges terminate in a distal end which in cross section is in the form of hooks oriented in two opposite directions, i.e. oriented so as to face one another.

Thus, as shown in FIG. 2, the proximal ends 11, 11' of the two flanges 8, 8' are located on either side of the central longitudinal axis yy' and are offset one with respect to the other in the longitudinal direction: they are offset by the same distance on each side of the central transverse axis xx'. More precisely, in this embodiment, the two flanges 8, 8' are located symmetrically with respect to an axis of symmetry perpendicular to said plate, said axis of symmetry being perpendicular both to the central longitudinal axis yy' and to the central transverse axis xx'.

The cut-outs 9, 9' produced in the plate 7 are arranged in such a way that each bending axis uu' is separated transversely a from the longitudinal edges of the plate 7 so as to form a marginal area 7a intended to be at least partly, and preferably completely, covered by the polymer material of the profiled seal 3 during the encapsulation phase, and as shown in FIG. 3, so that the plate 7 of the clip is held in place by the profiled seal 3.

Figure 4:
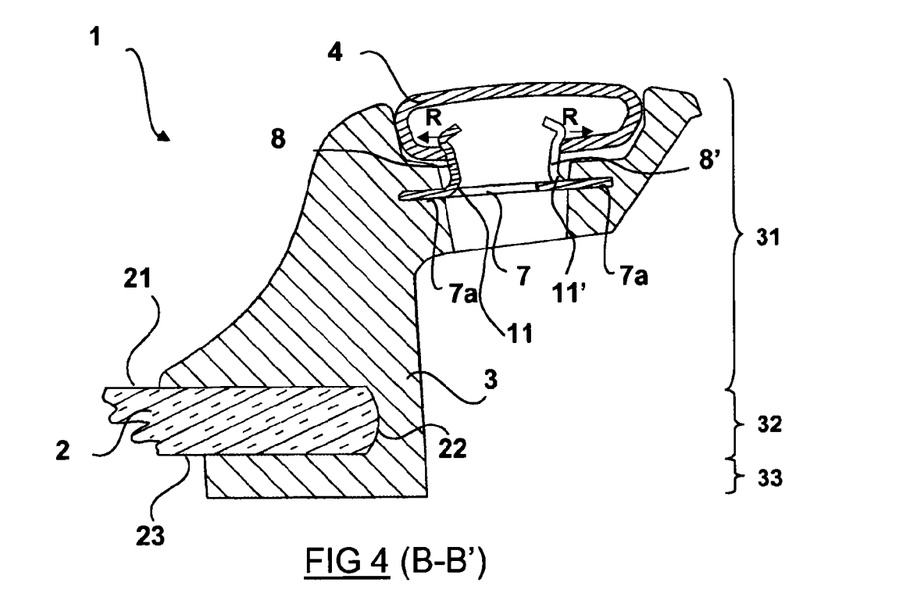
FIG. 4 is a cross-sectional view along BB' of FIG. 1.

As can be seen in FIG. 4, the plate 7 of the fastener 5 is thus overmolded at least partly (i.e. at least over part of its periphery) in said outer part 33 of said portion of the profiled seal 3, the plate 7 supporting at least two flanges 8, 8' that are located outside the portion of the profiled seal 3, in order to fasten the insert 4 to said fastener 5. The plate 7 of the fastener 5 could be at least partially overmolded in the lateral part 32, or else the plate 7 could be overmolded in the inner part 31 of said portion of the profiled seal 3, especially if the profiled seal is not very thick at this point.

As may also be seen in FIG. 4, the flanges 8, 8' extend substantially perpendicular to the plate 7 on the opposite side from the inner face 21 of the glazed element 2, i.e. toward the exterior of the vehicle when the window is considered which is mounted on a vehicle.

The clip thus comprises a region for joining with the encapsulation material which is overmolded onto the glazed element 2 and which consists of the periphery of the plate 7, more precisely the marginal areas 7a of width a and the longitudinal ends of the plate 7.

The plate 7 includes here, at each longitudinal end, at least one notch 6 for the positioning and/or fastening of the fastener 5 in the encapsulation mold.

Preferably, and as shown in FIG. 3, especially so as to facilitate demolding after the encapsulation operation, that part of the flanges 8, 8' which lies furthest to the outside, mainly the distal end 12, 12' in the present embodiment of the invention, lies inside of the clip relative to a longitudinal plane P, visible in FIG. 3, and perpendicular to the plate 7 and separated from the longitudinal edges by the marginal distance a.

In other words, each flange 8, 8', lies completely inside a space bounded by the perpendicular projection of the perimeter of the plate, so as to allow the profiled sealing bead 3 and the fastening element 5 to be easily demolded.

During the encapsulation operation, the profiled sealing bead 3 is formed on the glazed element 2, this profiled sealing element covering the marginal area 7a of width a of the plate 7, as shown in FIG. 4, and also the longitudinal ends of the plate.

The trim here consists of a profiled element having a cross section having an upside-down U shape, the furthermost legs 4a of which are turned toward the center so that the ends thereof are separated by a distance b which is slightly less than the transverse distance c separating the two bosses of the two flanges 8, 8' of the clip.

Figure 5:
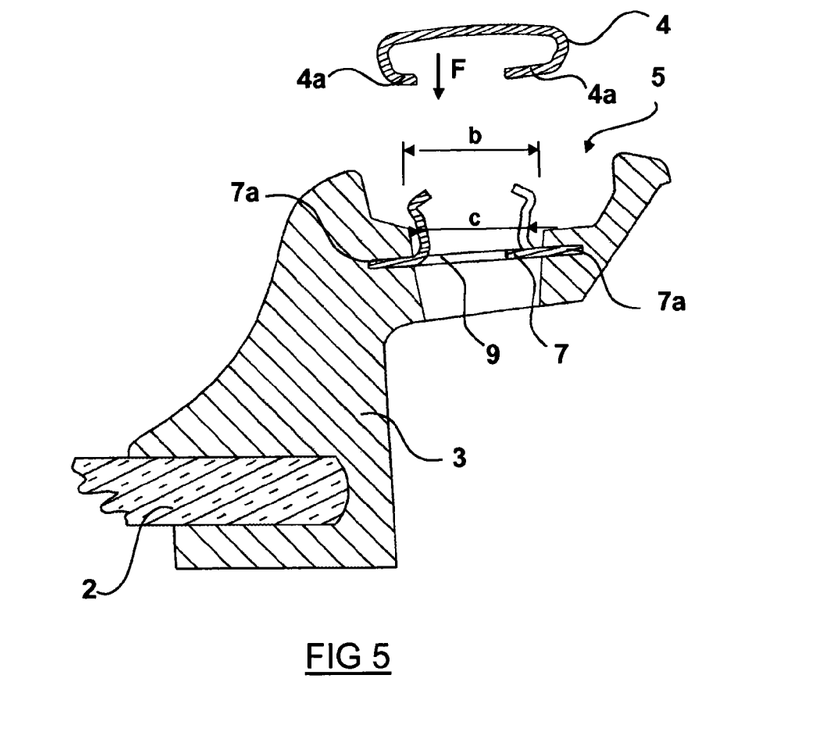
FIG. 5 is an equivalent view of FIG. 4 as the insert is being clip-fastened.

To fit the trim, it is presented, as may be seen in FIG. 5, above the clip and applied to the latter with a sufficient force F so that, during this action, the ends of the flanges are brought closer together and so that the legs 4a of the trim, once the bosses of the distal ends 12, 12' have been passed, are subjected to a resilient retaining force having transverse components R (visible in FIG. 4) that are dependent on the magnitude of the deformation undergone by the flanges 8, 8' during the fitting operation, on the cross section of the flanges 8, 8' and on the elastic modulus of the material that constitutes said flanges.

To improve the retention of the trim once it is in place on the clip, as shown in FIG. 4, the profiled sealing bead 3 may be given a shape appropriate for retaining the trim. For example, in the present embodiment, the profiled sealing bead 3 may be given dimensions such that, when the trim is fitted onto the fastener it is applied by the latter against said profiled sealing bead.

Figure 6:
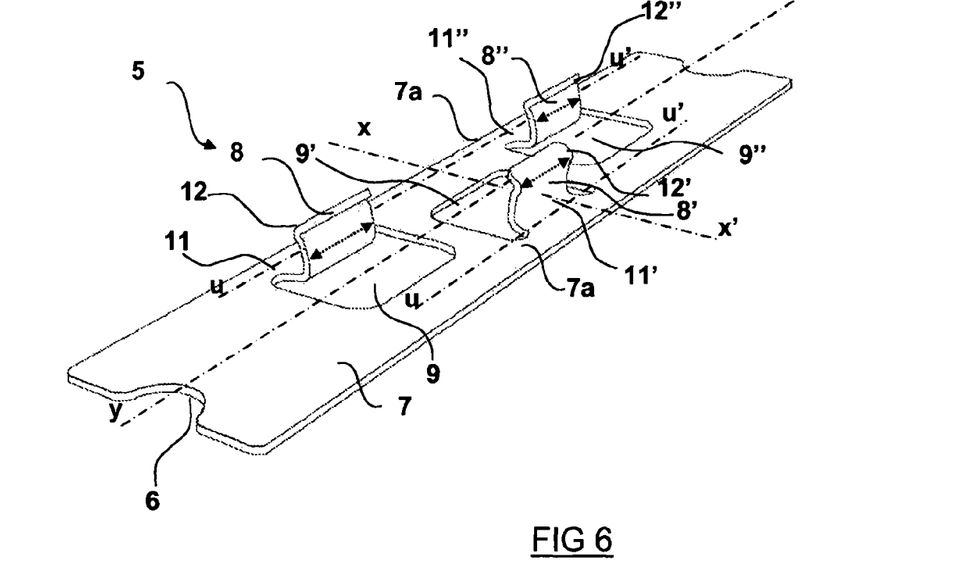
FIG. 6 is a perspective view of an embodiment of a fastener according to the invention having three flanges that are all longitudinally offset and having an apertured plate.

Of course, the clip may have more than two flanges, as shown in FIG. 6.

Preferably, the flanges 8, 8', 8" alternate so that two adjacent flanges have their respective proximal ends 11, 11', 11" on either side of the central longitudinal axis yy' of the clip.

The cut-outs 9, 9', 9" produced in the plate 7 are arranged so that each bending axis uu' is separated transversely by a marginal distance a from the longitudinal edges of the plate 7 so as to form a marginal area 7a intended to be at least partly and preferably completely covered by polymer material of the profiled seal 3 during the encapsulation phase, and as shown in FIG. 3, so that the plate 7 of the clip is retained by the profiled seal 3. The bending axes uu' are preferably identical for two flanges located on the same side of the central longitudinal axis yy'.

In FIG. 6, the plane of symmetry, showing the symmetry of the plane of the configuration of the flanges, is the plane that passes through the central transverse axis xx' and is doubly perpendicular to the central longitudinal axis yy'.

In an unillustrated alternative embodiment of FIG. 6, the central flange 8' has a length (along the longitudinal direction, illustrated by a dotted double-headed arrow), for example of 8 mm, which is equal to the sum of the length (each also illustrated by a dotted double-headed arrow) of the two other flanges 8, 8", these two other flanges having in this example one and the same length of 4 mm.

In all the above embodiments, because of the presence of the cut-outs 9, 9', 9" in the plate 7, it is necessary for the plate 7 to be placed in the encapsulation mold on a support intended to prevent the encapsulant from penetrating via the cut-outs 9, 9', 9".

Figure 7:
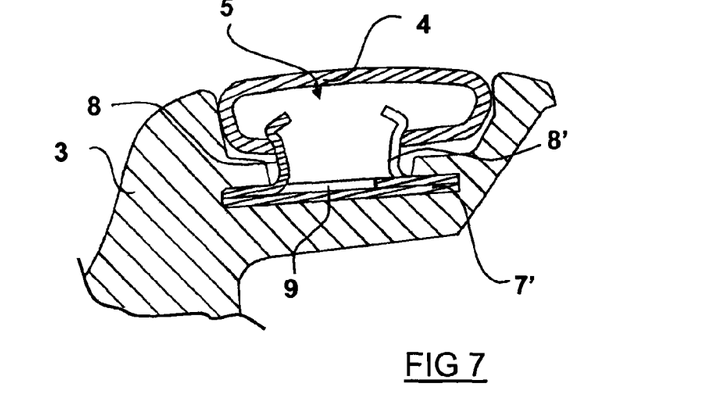
FIG. 7 is an equivalent view of FIG. 4 of another embodiment of a fastener according to the invention having a plate consisting of a double sheet.

In an embodiment of the invention shown in FIG. 7, the two flanges 8, 8' are produced as in the preceding embodiments by cutting the plate 7', but here the plate 7' comprises at least two sheets of material, (such as for example sheets of a metal alloy) which are superposed in such a way that only that sheet of the plate closest to the insert 4 has the cut-outs 9, the other sheet(s) plate not having a cut-out. Thus, it is unnecessary to provide special means for preventing the encapsulant from penetrating via a cut-out 9, 9', 9" in each plate/flange joining region, since these cut-outs open only onto a main face of the plate, on that face closest to the insert.

Figure 8:
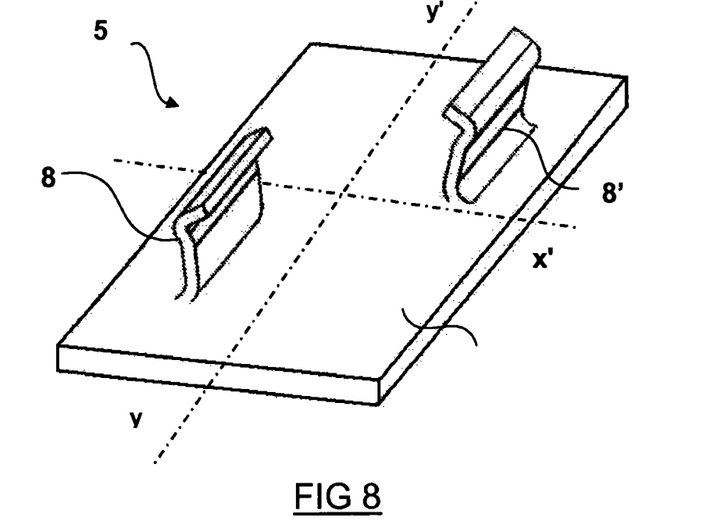
FIG. 8 is a perspective view of another embodiment of the fastener according to the invention having two longitudinally offset flanges and an unapertured plate.

The embodiment shown in FIG. 8 corresponds to the embodiment shown in FIG. 2 but with one difference: the flanges are no longer produced by cutting the material of the plate followed by two bending operations, but the entire clip is produced by molding. Thus, this embodiment also has the advantage of the embodiment of FIG. 7, namely the plate 7" of the clip has no cut-out traversing the plate in each plate/flange joining region.

It should be noted that the plate 7, 7', 7" may have one or more through-holes, in particular in a surface (or surfaces) 7a so as to increase the retention of the plate by the profiled sealing strip 3 in at least one region of the plate which is outside a plate/flange joining region.

Figure 9:
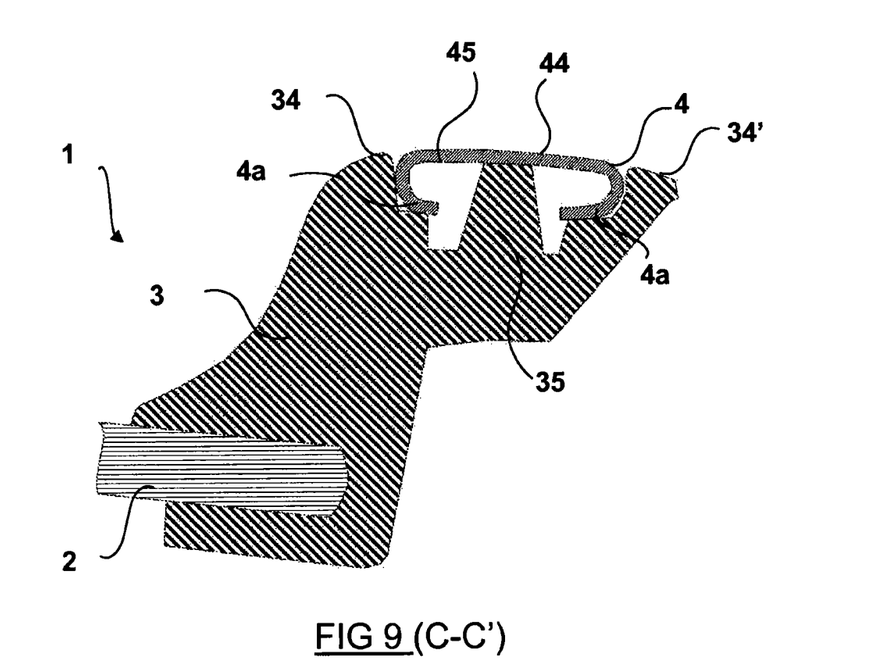
FIG. 9 is a cross-sectional view along CC' of FIG. 1.

For even better retention of the trim when it is fitted onto the clip, it is possible to configure the profiled sealing bead 3 such that, outside a region where the trim is retained by the clip, the sealing bead holds the trim in place, as shown in FIG. 9.

In this figure it is obvious that the profiled sealing bead 3 is hollowed all along the insert 4 so that the outermost surface 44 of the insert is substantially flush with the outermost surface 34, 34' of the profiled sealing bead.

In addition, the width of the hollow is substantially identical to the width of the insert so that the walls of the hollow hold the insert in place.

Furthermore, it is possible to provide a central boss at the center of the hollow of the profiled bead receiving the insert, this boss providing a bearing surface for the inner face 45 of the insert.

Figure 10:
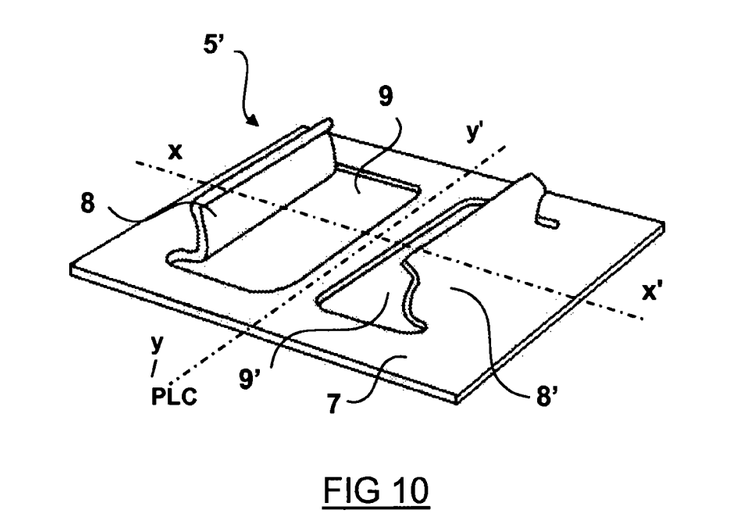
FIG. 10 is a perspective view of a counter-embodiment of a fastener having two facing flanges and an apertured plate.
Figure 11:
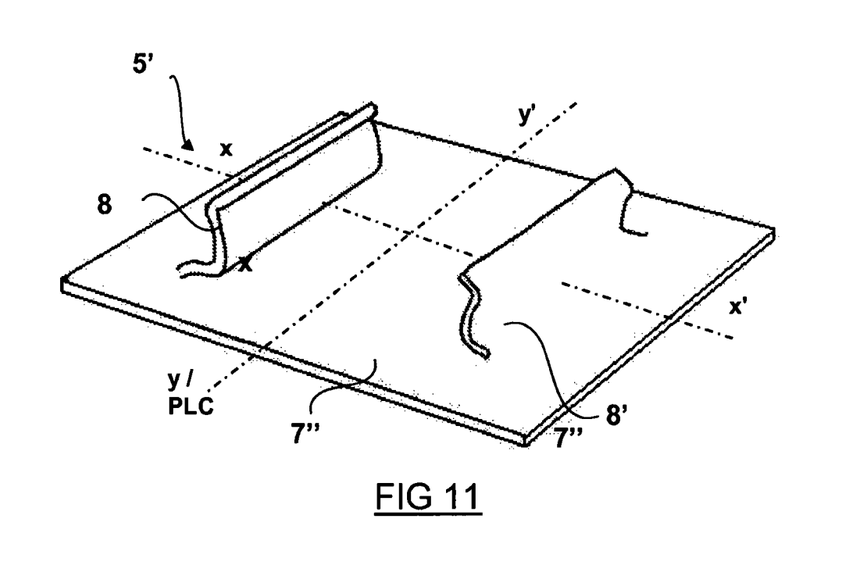
FIG. 11 is a perspective view of another counter-embodiment of a fastener having two facing flanges and an unapertured plate.

In the counter-examples illustrated in FIGS. 10 and 11, the flanges 8, 8' of the fasteners 5' are formed by cutting out the plate 7, in the same way as for the embodiment shown in FIGS. 1 to 5 in respect of FIG. 10 and are formed in the same way as for the embodiment shown in FIG. 8 in respect of FIG. 11, except that the flanges 8, 8' are arranged facing each other, on each side of the central longitudinal axis yy'. Thus, the two flanges 8, 8' are located symmetrically with respect to this central longitudinal axis yy', that is to say the two flanges 8, 8' are located symmetrically with respect to the central longitudinal plane PLC.

These two solutions are unsatisfactory since, for a series of windows, loosening of the plate readily occurs, during the clip-fastening operation, caused by a rotational movement of the plate about a rotation axis passing through its longitudinal plane of symmetry PLC and perpendicular to the plate.

The invention claimed is:

1. A method of manufacturing a window, the method comprising:
   providing a glazed element;
   providing at least one portion of a profiled seal;
   providing at least one insert or a trim; and
   providing at least one fastener for fastening the insert or trim to the portion of the profiled seal, the fastener including
   a plate having a longitudinal axis, the plate being at least partially overmolded in the portion of the profiled seal, and
   at least two flanges that are longitudinally offset from each other along the plate and located outside the portion of the profiled seal, the insert or trim being fastened to the fastener via the at least two flanges, and the at least two flanges extending from cut-out portions of the plate such that the cut-out portions do not extend to a periphery of the plate.

2. A window comprising:
   a glazed element;
   at least one portion of a profiled seal;
   at least one insert or a trim; and
   at least one fastener for fastening the insert or trim to the portion of the profiled seal, the fastener including
   a plate having a longitudinal axis, the plate being at least partially overmolded in the portion of the profiled seal, and
   at least two flanges supported on the plate and located outside the portion of the profiled seal, the insert or trim being fastened to the fastener via the at least two flanges, the flanges being longitudinally offset from each other, and the at least two flanges extending from cut-out portions of the plate such that the cut-out portions do not extend to a periphery of the plate.

3. The window as claimed in claim 2, wherein at least two of the at least two flanges each terminate in a distal end which is hook-shaped in cross section, at least two hooks being oriented in two opposite directions.

4. The window as claimed in claim 2, wherein two flanges are located symmetrically with respect to an axis of symmetry perpendicular to the plate, the flanges having a same length.

5. The window as claimed in claim 2, wherein three flanges are located symmetrically with respect to a plane of symmetry perpendicular to the plate.

6. The window as claimed in claim 5, wherein a central flange of the three flanges has a length equal to a sum of length of the two other flanges, the two other flanges having a same length.

7. The window as claimed in claim 2, wherein the plate is unapertured in a part thereof connecting with at least one flange.

8. The window as claimed in claim 2, wherein at least one of the at least two flanges is made from a portion of the plate which is cut and bent up.

9. The window as claimed in claim 2, wherein the plate has a rectangular shape and includes, at each longitudinal end, at least one notch or a hole.

10. The window as claimed in claim 2, wherein the plate is overmolded along at least two strips of the plate, each strip being a marginal are of the plate extending along a length of the plate.

11. The window as claimed in claim 2, wherein at least one of the least two flanges extends completely within a space bounded by a perpendicular projection of a perimeter of the plate.

12. The window as claimed in claim 2, wherein the insert or trim is applied at least along one longitudinal edge of the window, or along at least two edges of the window, against the portion of the profiled seal.

13. A fastener for a window including a glazed element, at least one portion of a portion seal, and at least one insert or a trim, the fastener comprising:
   a plate having a longitudinal axis; and
   at least two longitudinally offset flanges supported on the plate for fastening the insert or trim to the fastener, the at least two flanges extending from cut-out portions of the plate such that the cut-out portions do not extend to a periphery of the plate.

* * * * *